June 23, 1925.

1,542,891

J. H. KLAASSEN

POULTRY FEEDER

Filed July 6, 1923

Inventor

John H. Klaassen.

By Grace C. Sandler

Attorney

Patented June 23, 1925.

1,542,891

UNITED STATES PATENT OFFICE.

JOHN H. KLAASSEN, OF GEORGE, IOWA.

POULTRY FEEDER.

Application filed July 6, 1923. Serial No. 649,911.

*To all whom it may concern:*

Be it known that I, JOHN H. KLAASSEN, a citizen of the United States, residing at George, in the county of Lyon, State of Iowa, have invented certain new and useful Improvements in Poultry Feeders; and I do hereby declare the following to be a full, clear, and exact description of the invention, such as will enable others skilled in the art to which it appertains to make and use the same.

This invention relates to poultry appliances and more particularly to devices designed for applying oil or other vermin destroying fluids to the heads of poultry and especially to the heads of young chicks.

The invention has for its object not only to provide a thoroughly efficient and practical head oiler, of the character stated, but is also designed for automatically supplying feed to the poultry.

Another object is to provide a device of this nature which may be readily adjusted to suit the various ages of the chicks.

With these and other objects in view, the invention resides in the novel construction, combination and arrangement of parts as will be more fully hereinafter described, illustrated in the accompanying drawing and particularly pointed out in the claims.

Figure 1:
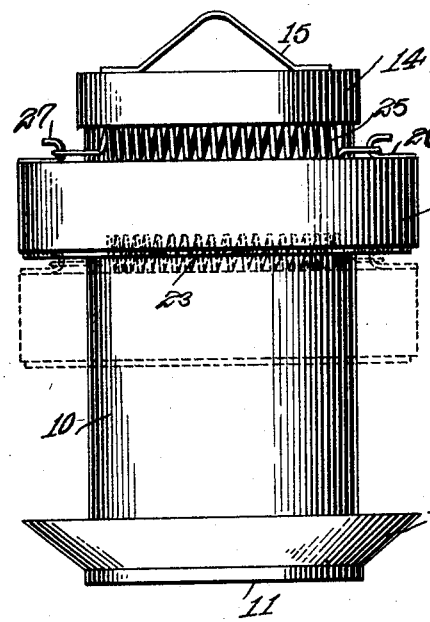
Figure 2:
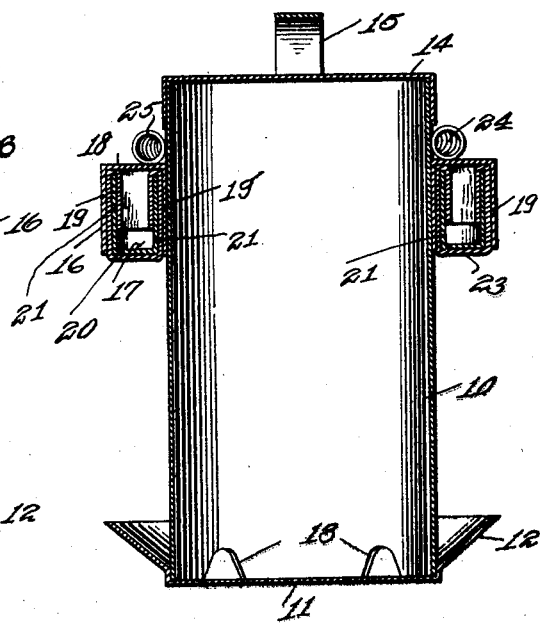
Figure 3:
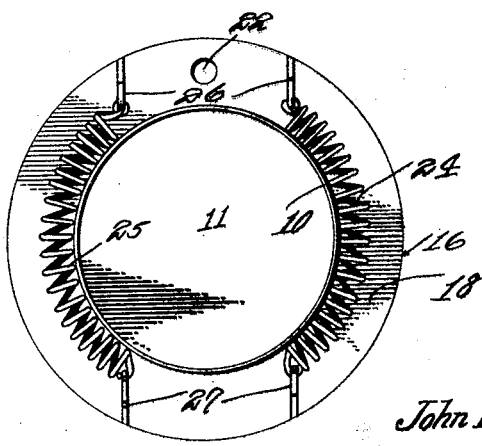

In the drawing wherein like characters of reference denote corresponding parts throughout the several views, Figure 1 is a side elevation of a combined chick feeder and head oiler constructed in accordance with the present invention, Fig. 2 is a central sectional view of the same and, Fig. 3 is a top plan view thereof, with the cover for the casing removed.

Referring now to the drawings and more particularly to the means for automatically supplying feed to the poultry, there is employed a cylindrical casing 10 having an open top and being provided with the bottom 11. This bottom extends outwardly beyond the circumferential plane of the casing 10 with the extended portion being slightly upturned to form the feed trough 12. The casing is provided adjacent the bottom 11 with a series of openings 13, which openings are positioned at regular intervals throughout the circumference of the said casing. The top of the casing 10 is provided with the removable cover 14 having the handle 15. It will thus be seen that the feed, when placed within the casing 10, will gravitate through the openings 13 into the feed trough 12 and as the feed within the trough is eaten by the poultry, more feed will gravitate through the openings to take its place.

The means for supplying oil to the heads of the chicks is positioned directly above the feed trough 12 and includes a cylindrical cover member 16 and the cylindrical oil containing member 17. The cover member 16 is provided with the top wall 18 and the side walls 19 while the oil container 17 is provided with the bottom wall 20 and the side walls 21. The side walls 21 of the oil container 17 are adapted to be received within the space between the side walls 19 of the cover member 16, as will be clearly seen in Figure 2.

In the top wall 18 of the cover member 16, there is formed an opening 22 through which oil is to be supplied to the oil container 17 and the oil is then conducted from the inside of the container to the outside, through the medium of the absorbent material 23. This material is adapted to cover the bottom and side walls of the oil container and the edges of the absorbent material are adapted to hang down in the oil within the container. The oil containing member 17 is also held within the cover member 16 through the medium of the friction which naturally results when the absorbent material is pressed between the side walls of the cover member and oil container.

The oiling device is held in position upon the casing by the friction between the said casing and the springs 24 and 25. These springs 24 and 25 have their ends secured to the oppositely directed hooks 26 and 27 and it will be noted that the springs are so positioned that they normally span a portion of the opening within the cylindrical members so that when it is desired to place the oiling means on the casing the springs must be stretched outwardly, as shown in Figure 3 with the result that they bear against the casing and thereby hold the oiler in its desired position.

When it is desired to oil the heads of the chicks, the oiler is first properly positioned on the casing, according to the age of the chicks and feed is then placed within the container or casing, and because of the absorbent qualities of the absorbent material, this material becomes thoroughly saturated with the oil from within the oil container with the result that as the chicks raise their heads after eating from the trough, their heads come into contact with the oily material and their heads thereby oiled.

It is of course to be understood that while one particular form has been shown for carrying the invention into practice, various changes in the construction, and arrangement of the device may be resorted to without departing from the scope of the invention set forth in the appended claims.

What is claimed is:

1. The combination with a feeding device including a receptacle having a feeding means, of a disinfectant container encircling the receptacle and slidable longitudinally thereof, and resilient means carried by the container and frictionally engaged with the receptacle for holding the container at different distance from the feeding means.

2. The combination with the feed container of a poultry feeding device having a feeding tray on its lower end, of a disinfectant discharging means encircling the container and being movable toward and away from the feeding tray, and friction means on the disinfectant means engaged with the container for holding the said means in adjusted positions with respect to the feeding tray.

3. The combination with the upright feed container of a poultry feeding device having a feeding tray on its lower end, of a disinfectant discharging means including a hollow disinfectant ring encircling the container and arranged to be moved toward and away from said tray, and means on the ring frictionally engaged with the container for holding the ring in different adjusted positions with respect to said tray.

4. The combination with the upright container of a poultry feeding device having a tray on its lower end, of a disinfectant discharging means including a hollow ring encircling the container and arranged to be moved toward and away from said tray, means carried by the ring for discharging disinfectant onto poultry eating from said tray, and spring means secured to the ring and frictionally encircling the receptacle whereby to hold the ring in different positions with relation to said tray.

In testimony whereof, I affix my signature, in the presence of two witnesses.

JOHN H. KLAASSEN.

Witnesses:
  C. C. CRAWFORD,
  H. D. AYKENS.